United States Patent
Ananias

(10) Patent No.: US 6,956,753 B1
(45) Date of Patent: Oct. 18, 2005

(54) METHOD AND SYSTEM FOR PROVIDING A TEMPERATURE COMPENSATED FEEDBACK SIGNAL

(75) Inventor: James W Ananias, Indianapolis, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/827,804

(22) Filed: Apr. 20, 2004

(51) Int. Cl.[7] .............................................. H02M 3/28
(52) U.S. Cl. .................... 363/80; 363/20; 327/513; 327/538
(58) Field of Search ................. 363/20, 80; 327/513, 327/538

(56) References Cited

U.S. PATENT DOCUMENTS

| | | | |
|---|---|---|---|
| 4,642,666 A | 2/1987 | Lidow et al. | |
| 4,705,759 A | 11/1987 | Lidow et al. | |
| 4,959,699 A | 9/1990 | Lidow et al. | |
| 5,008,725 A | 4/1991 | Lidow et al. | |
| 5,130,767 A | 7/1992 | Lidow et al. | |
| 6,300,818 B1 * | 10/2001 | Mao | 327/513 |
| 6,724,196 B1 * | 4/2004 | Chiaro et al. | 324/609 |
| 6,870,352 B2 * | 3/2005 | Walters et al. | 323/277 |

* cited by examiner

Primary Examiner—Gary L Laxton
(74) Attorney, Agent, or Firm—Stefan V. Chmielewski

(57) ABSTRACT

An electrical circuit for providing a temperature compensated feedback signal includes a first electrical component and a first amplifier. The first electrical component exhibits a first temperature variable impedance and is positioned in thermal contact with a first switch having a second temperature variable impedance. The first amplifier includes an input electrically coupled to the first switch and an output electrically coupled to an input of the first electrical component. The first amplifier amplifies the signal produced across the first switch when the first switch is conducting and the first electrical, component attenuates the amplified signal provided by the first amplifier as a function of a temperature of the first electrical component. The attenuated amplified signal is provided at an output of the first electrical component to provide a temperature compensated feedback signal.

28 Claims, 4 Drawing Sheets

METHOD AND SYSTEM FOR PROVIDING A TEMPERATURE COMPENSATED FEEDBACK SIGNAL

TECHNICAL FIELD

The present invention is generally directed to a method and system for providing a feedback signal and, more specifically, to a method and system for providing a temperature compensated feedback signal.

BACKGROUND OF THE INVENTION

In a typical switching power supply that implements pulse width modulation (PWM), control loops have been implemented at an output of the supply and/or at a primary switch, for example, a field-effect transistor (FET). In general, inner-loop current feedback at the primary switch is desirable to provide stability and/or to detect overcurrent conditions. In a typical switching power supply, relatively expensive magnetic-field sensing hardware, such as a Hall-effect or magnetorestrictive sensor, or a very low-value power resistor, which is inserted in series with the switch, have been utilized to provide current feedback. When a resistor is utilized in series with the switch, the ramp voltage developed across the series resistor is then fed back to a control unit, which utilizes ramp slope information, along with an instantaneous output voltage, to control the modulation of a control signal applied to a control terminal of the switch.

Field-effect transistors (FETs) have been widely utilized as primary switches in switching power supplies. Various articles have proposed utilizing a saturation resistance, i.e., a drain-to-source resistance $R_{DSon}$, of a FET to serve as a current sense resistor for the FET. However, the resistance of a typical conducting FET may vary over one-hundred percent over typical temperature operating ranges. As such, these temperature variable resistance changes may result in large errors in current feedback and, as a result, the current loop characteristics of a switching power supply implementing this technique are highly temperature sensitive.

Due to cost considerations, it would be desirable to develop a circuit for a switching power supply that measures a primary switch current economically and with enough accuracy to allow for adequate current loop control. What is needed is a technique for providing a temperature compensated feedback signal for a switching power supply.

SUMMARY OF THE INVENTION

An electrical circuit for providing a temperature compensated feedback signal includes a first electrical component and a first amplifier. The first electrical component exhibits a first temperature variable impedance. In operation, the first electrical component is positioned in thermal contact with a first switch having a second temperature variable impedance. The first amplifier includes an input electrically coupled to the first switch and an output electrically coupled to an input of the first electrical component. The first amplifier amplifies a signal produced across the first switch, when the first switch is conducting, and the first electrical component attenuates the amplified signal, provided by the first amplifier, as a function of the temperature of the first electrical component. The attenuated amplified signal is provided at an output of the first electrical component and acts as a temperature compensated feedback signal. The temperature compensated feedback signal may be utilized by an external control unit to determine whether an overcurrent condition exists and/or the circuit is unstable and, if so, take an appropriate action.

According to another embodiment of the present invention, a second amplifier, including an input electrically coupled to the output of the first electrical component, is provided. The second amplifier amplifies the attenuated amplified signal to provide the temperature compensated feedback signal at the output of the second amplifier. According to another aspect of the invention, a second switch, which is electrically coupled to the input of the first amplifier, is provided. The second switch couples the input of the first amplifier to ground, when the first switch is not conducting. The first electrical component may be a thermistor with a positive temperature coefficient that substantially matches a temperature coefficient of the first switch. Ideally, the temperature of the thermistor is within a +/−5 degrees Celsius of a temperature of the first switch. The first switch may be one of a field-effect transistor (FET) or an insulated-gate bipolar transistor (IGBT) and the first and second temperature variable impedances may be temperature variable resistances.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

As is described above, power switching supplies have been proposed that utilize a saturation resistance of a field-effect transistor (FET) to provide a feedback signal to a control unit for controlling the FET, which acts as a switch for a switching power supply. However, as also noted above, utilizing the FET saturation resistance to provide an indication of the current carried by the FET may result in large errors in a sensed feedback current, as a FET drain-to-source resistance $R_{DSon}$ tends to be highly temperature dependent. As a general rule, it is not necessary for the FET current to be measured with extreme precision. Typically, a measurement accuracy of ten to twenty percent is sufficient for reliable loop control. As such, according to the present invention, a relatively accurate feedback signal is achieved by compensating for temperature effects on the FET drain-to-source resistance $R_{DSon}$ to a sufficient degree. Accordingly, the added dissipation of a series current sense resistor is eliminated and, as a result, the resulting power conversion efficiency of the switching power supply is increased.

The circuit described herein can be implemented at approximately the same cost as that of a high-precision current sense resistor. In general, it is desirable that the electrical component, e.g., a thermistor, have a temperature variable impedance that is similar to that of the switching FET. Further, the electrical component should be selected to have a positive temperature coefficient curve with minimal curvature. It desirable for the electrical component to be positioned relatively close to a drain of the switching FET such that the temperature of the electrical component and the FET are approximately the same, e.g., within +/−5 degrees Celsius.

Figure 1:
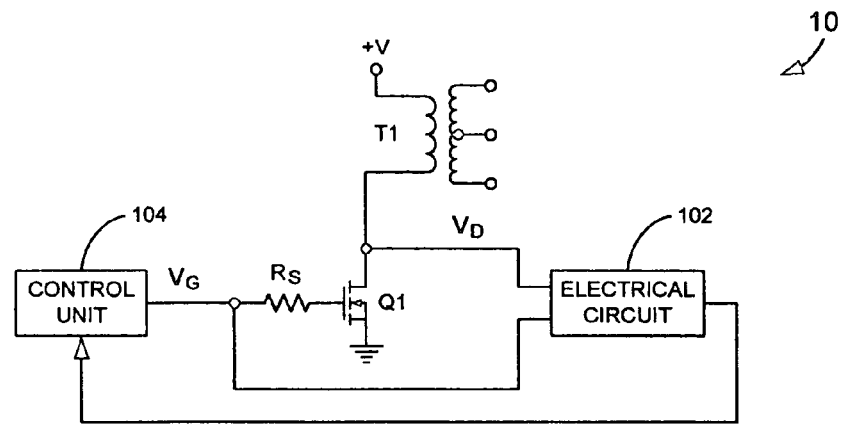
FIG. 1 is an exemplary electrical block diagram of a control system for a switching power supply.

With reference to FIG. 1, a portion of a switching power supply 10 includes a control unit 104 and an electrical circuit 102. The control unit 104 provides a control signal, through a series resistor $R_s$ to a gate of a transistor Q1, e.g., a FET or an insulated-gate bipolar transistor (IGBT). A source of the transistor Q1 is coupled to ground and a drain of the transistor Q1 is coupled to one side of a primary of a transformer $T_1$, whose other side is coupled to a positive terminal of a voltage supply +V. A first input of the electrical circuit 102 is coupled to the drain of the transistor Q1 and a second input of the electrical circuit is coupled to an output of the control unit 104. In this manner, the electrical circuit 102 can determine when the control unit 104 has applied a voltage $V_G$ to a gate of the transistor Q1, to turn the transistor Q1 on. The electrical circuit 102 provides feedback to an input of the control unit 104 such that the control unit 104 can determine the current through the transistor Q1 and take an appropriate action.

Figure 2:
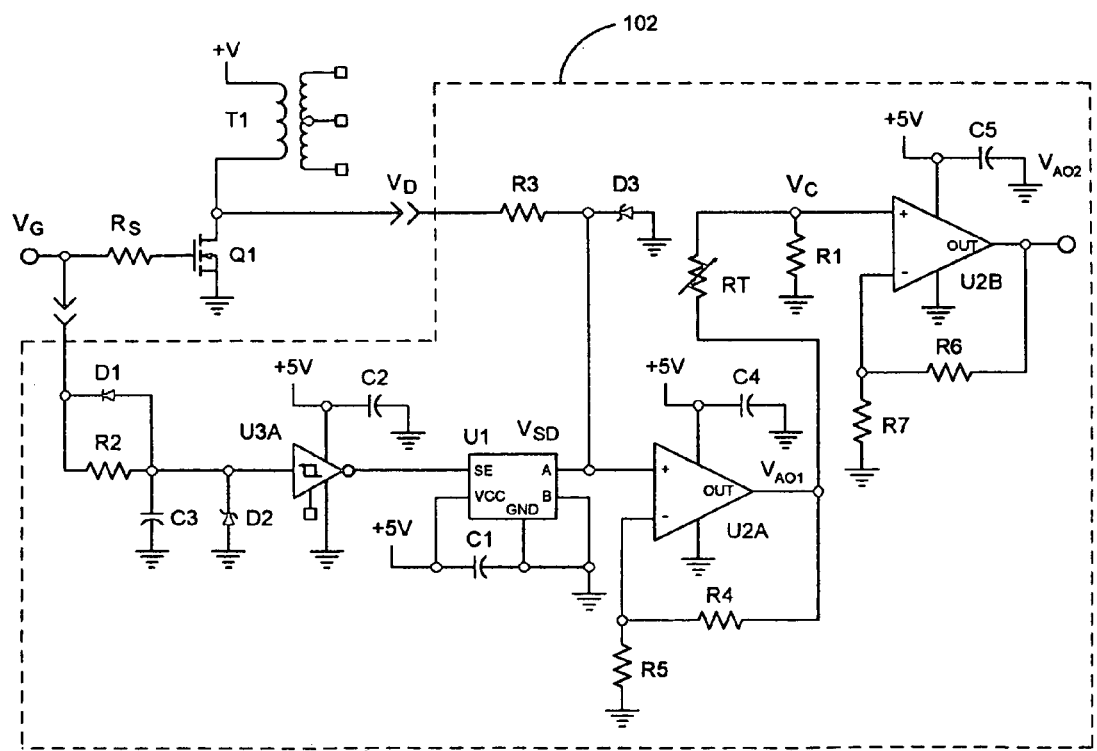
FIG. 2 is an electrical diagram of an electrical circuit for providing a temperature compensated feedback signal.

As is better shown in FIG. 2, the circuit 102 is used to replace the traditional current sense resistor required for ground referenced inner-loop current feedback in a switching power supply. As mentioned above, this is desirable to increase the efficiency of the power supply and to eliminate additional internal heating that accompanies sense resistor losses. The circuit 102 samples the drain voltage, $V_D$, of the transistor Q1 during its on-time, isolates the sampled sawtooth signal $V_{SD}$ and amplifies the signal $V_{SD}$ to provide a signal $V_{AO1}$. The signal $V_{AO1}$ is an amplified version of the voltage dropped across the temperature dependent FET. The signal $V_{AO1}$ is then attenuated as a function of temperature by the resistive divider, i.e., electrical component RT and resistor R1, to compensate for increases in the FET Q1 drain-to-source resistance $R_{DSon}$ with temperature. The divided signal $V_C$ is then amplified to produce an output signal $V_{AO2}$, which is essentially an amplified version of the voltage signal, which would be developed across a reasonably temperature independent FET.

The choice of using two amplification stages is desirable in order to drive the divider with a low-impedance source and present a low-impedance output for loop feedback control purposes. It is also desirable for the amplifiers to exhibit a reasonably wide bandwidth, e.g., 130 MHz, in order to provide substantial gain to low-amplitude input signals, while faithfully replicating relatively high-bandwidth signals.

Isolating the FET Q1 saturation ramp voltage may be achieved using a NC7SZ66 high-speed analog transmission gate U1. The gate U1 includes an internal transmission FET (between pins 1 and 2 of the device) that has a maximum drain-to-source resistance $R_{DSon}$ of seven ohms and in this application is used to shunt the drain voltage signal of the FET Q1, through R3, to ground when the FET Q1 is off and to pass the on-time ramp unattenuated to a positive input of amplifier U2A when the FET Q1 is on. A low level at an SE input of the gate U1 turns off the internal FET during the FET Q1 on-time. This signal is generated by delaying the FET Q1 gate drive signal, until turn-on is achieved, and inverting and logic level translating this signal to high-speed complementary metal-oxide semiconductor (HCMOS) logic levels.

The electrical component RT may be implemented as a thermistor, manufactured and made commercially available by Infineon (Part No. KTY23-6). The component RT is located adjacent a drain of the FET Q1 in order that the resistance of the component RT vary in direct relationship with the drain-to-source resistance $R_{DSon}$ of the FET Q1. The KTY23-6 has a positive temperature coefficient resistance curve that is only slightly curved. This substantially linear resistance curve, shown in FIG. 3, is adequate to provide compensation for the selected FET (in combination with the divider resistor R1) due to the similar shape of resistance curve of the selected FET.

The resistance/temperature characteristics for the Infineon KTY23-6 are set forth below:

$$T_S := \begin{pmatrix} -50 \\ -40 \\ -30 \\ -20 \\ -10 \\ 0 \\ 10 \\ 20 \\ 30 \\ 40 \\ 50 \\ 60 \\ 70 \\ 80 \\ 90 \\ 100 \\ 110 \\ 120 \\ 130 \\ 140 \\ 150 \end{pmatrix} \quad R_S := \begin{pmatrix} 518 \\ 670 \\ 625 \\ 585 \\ 748 \\ 815 \\ 886 \\ 961 \\ 1040 \\ 1123 \\ 1209 \\ 1300 \\ 1394 \\ 1492 \\ 1594 \\ 1700 \\ 1810 \\ 1923 \\ 2041 \\ 2128 \\ 2235 \end{pmatrix} \cdot \Omega \quad I_S := 0 \ldots (\text{rows } (T_S) - 1)$$

Figure 3:
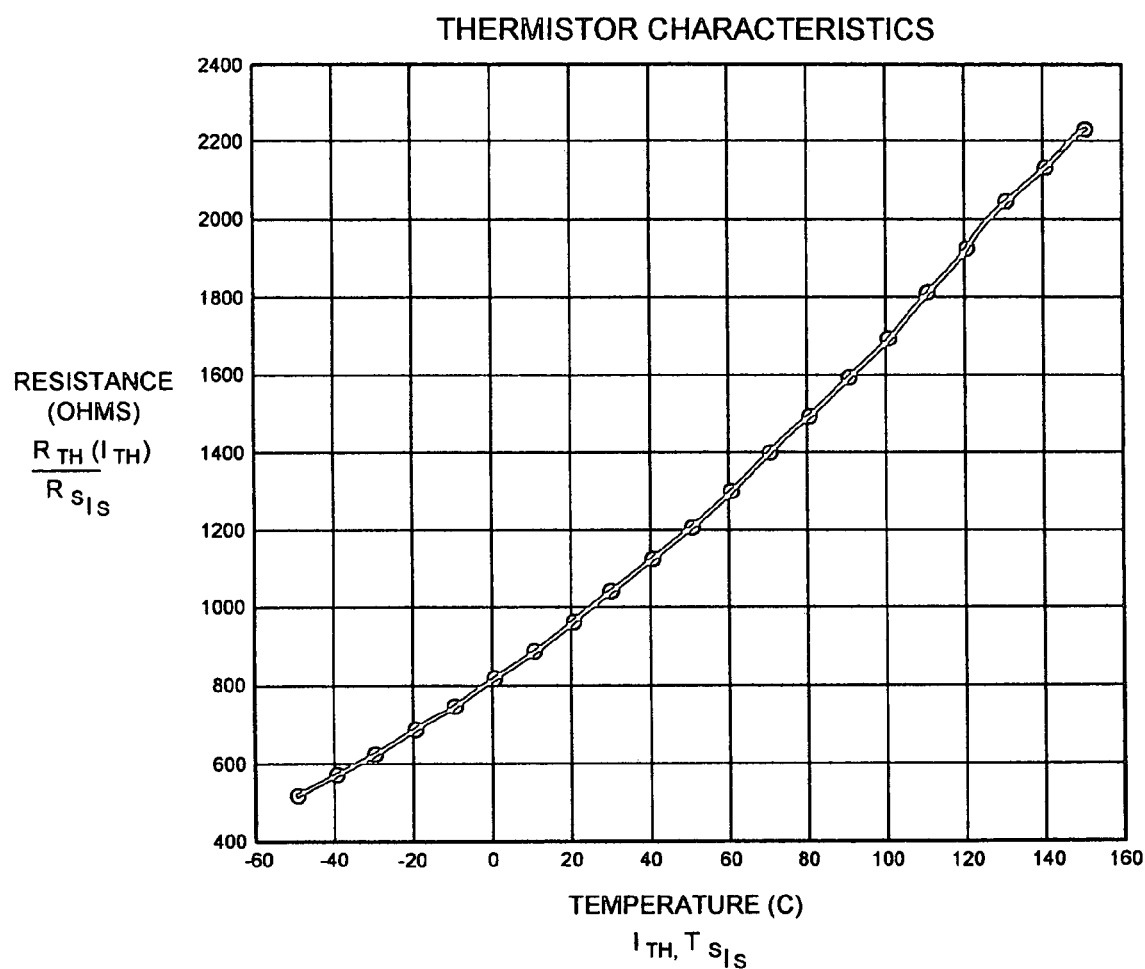
FIG. 3 is a graph depicting a temperature variable resistance curve of an exemplary thermistor.

As is shown in FIG. 3, a spline fit may be applied to approximate the resistance curve of the thermistor. In FIG. 3, the specification data is shown as circles and the solid line shows the spline fit.

In general, it is desirable to select a FET that has a drain-to-source resistance $R_{DSon}$ near nominal as indicated on a data sheet for the component. To determine whether the FET exhibits a nominal drain-to-source resistance the FET and thermistor may be mounted on a circuit board with a gate of the FET connected ta a voltage source to continuously turn-on the FET so that the FET can be evaluated. A drain of the FET is connected to a current source capable of supplying a saturation current to the FET, without exceeding the dissipation capability of the FET. A current probe is attached to measure drain current and a voltmeter is connected across the FET to measure a drain-to-source saturation voltage of the FET. An ohmmeter is connected across the terminals of the thermistor for monitoring its resistance and provides an indication of the temperature of the thermistor. The FET drain-to-source resistance $R_{DSon}$ can then be determined with respect to the thermistor temperature.

Figure 4:
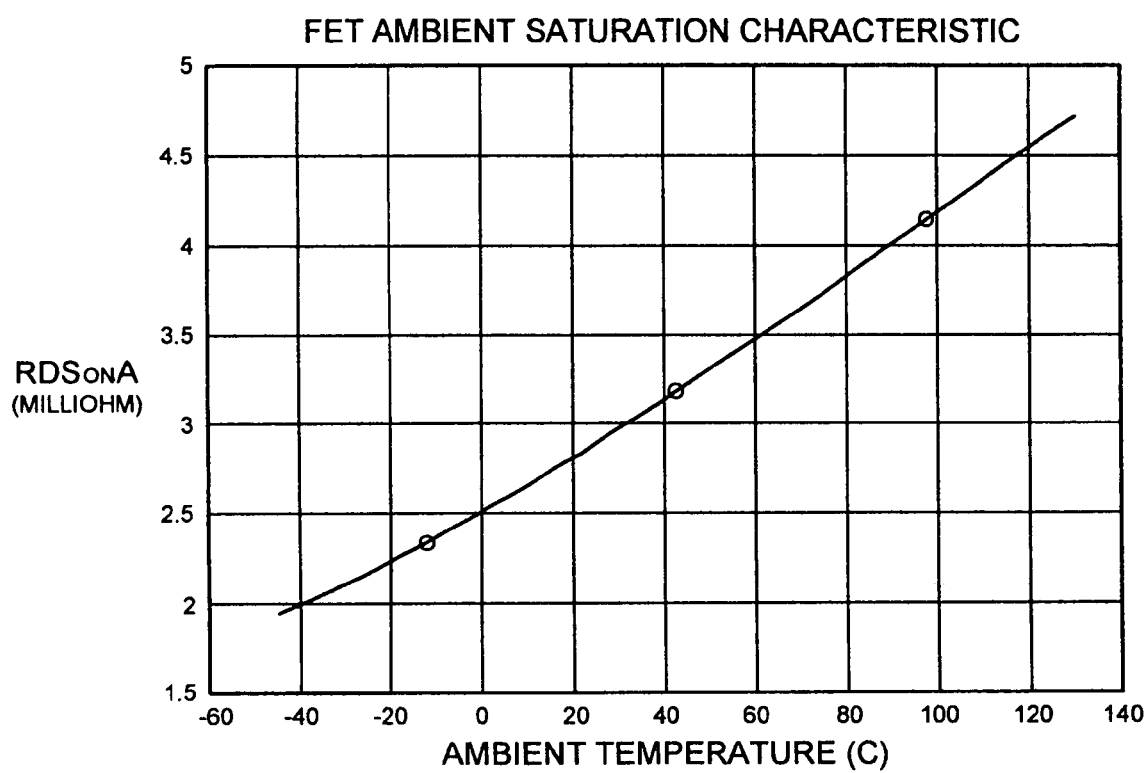
FIG. 4 is a graph depicting an exemplary temperature variable resistance curve of an exemplary field-effect transistor (FET)

As a general rule, it is sufficient to determine the FET drain-to-source resistance $R_{DSon}$ at three temperatures in a desired temperature range and then, using a spline function, to create a curve through the three points (see FIG. 4). The following provides an example of how to determine appropriate values for the components of the electrical circuit 102 of FIG. 2. Given an internal ambient operating temperature range, the FET drain-to-source resistance $R_{DSon}$ may be determined at temperatures $T_1$, $T_2$ and $T_3$ as defined below:

Given:

$T_{Ambmin} := -40$ $T_{Ambmax} := 125$ $$T_1 := T_{Ambmin} + \frac{T_{Ambmax} - T_{Ambmin}}{6}$$

$$T_2 := T_{Ambmin} + \frac{T_{Ambmax} - T_{Ambmin}}{2}$$

$$T_3 := T_{Ambmax} - \left(\frac{T_{Ambmax} - T_{Ambmin}}{6}\right)$$

For this range, the temperatures at which to determine the FET drain-to-source resistance $R_{DSon}$ and the corresponding thermistor resistances are given below in matrix form.

$$T_{Amb} := \begin{pmatrix} T_1 \\ T_2 \\ T_3 \end{pmatrix} \quad T_{Amb} = \begin{pmatrix} -12.5000 \\ 42.5000 \\ 97.5000 \end{pmatrix} \quad R_{Th}(T_{Amb}) = \begin{pmatrix} 731.9292 \\ 1144.1481 \\ 1673.0464 \end{pmatrix} \Omega$$

The circuit board is placed within an environmental chamber and the instrumentation leads described above are connected. The chamber is turned on and the chamber temperature is varied to sequentially achieve temperatures $T_1$, $T2$ and $T_3$, as indicated by the measured resistance of the thermistor. At each of these temperatures, the FET drain current $I_D$ and saturation voltage $V_{sat}$ are recorded. Results of some measurements using this procedure on a test circuit are given below, as are the resulting computed values of the FET drain-to-source resistance $R_{DSon}$ (designated $R_{DSonAT}$) at the specific temperatures.

$$T_{Amb} := \begin{pmatrix} T_1 \\ T_2 \\ T_3 \end{pmatrix} \quad I_D = \begin{pmatrix} 20.09 \\ 19.66 \\ 19.18 \end{pmatrix} \cdot \text{amp} \quad V_{sat} = \begin{pmatrix} .0469 \\ .0628 \\ .0795 \end{pmatrix} \cdot \text{volt}$$

$$R_{DSonAT} = \begin{pmatrix} \frac{V_{sat_{0,0}}}{I_{D_{0,0}}} \\ \frac{V_{sat_{1,0}}}{I_{D_{1,0}}} \\ \frac{V_{sat_{2,0}}}{I_{D_{2,0}}} \end{pmatrix} \quad R_{DSonAT} = \begin{pmatrix} 2.3345 \\ 3.1790 \\ 4.1449 \end{pmatrix} m\Omega$$

$I_{discrete} := 0 \ldots (\text{rows}(T_{Amb}) - 1)$

To approximate the FET drain-to-source resistance $R_{DSon}$ characteristic, another spline fit may be performed as follows:

$J_{Spline} := \text{cspline}(T_{Amb}, R_{DSonAT})$ $R_{DSonA}(T) := \text{interp}(J_{Spline}, T_{Amb}, R_{DSonAT}, T)$ $T_{interp} := T_{Ambmin} - 5, \ldots T_{Ambmax} + 5$ Assuming that the first amplifier U2A gain is unity, the circuit output voltage $V_C$ is then given by the following:

$$V_C = V_{SD} \cdot \left(\frac{R_1}{R_1 + R_{Th}(T)}\right) \quad V_{AOI} = V_{SD} = V_D$$

$$V_C = V_D \cdot \left(\frac{R_1}{R_1 + R_{Th}(T)}\right)$$

$$V_C = I_D \cdot R_{DSonA}(T) \cdot \left(\frac{R_1}{R_1 + R_{Th}(T)}\right)$$

As it is desirable for the output voltage $V_C$ to be constant with temperature for each value of $I_D$ over the temperature range, the right side of the following expression should be as nearly constant as possible. This expression represents the equivalent sense resistor value that would give an output $V_C$ with $I_D$ passing through it.

$$\frac{V_C}{I_D} = R_{DSonA}(T) \cdot \left(\frac{R_1}{R_1 + R_{Th}(T)}\right)$$

It is desirable to choose the value of $R_1$ to give the most constant value of the expression with respect to changes in temperature T. Assuming the initial value for R1 is chosen to be 500 Ohms and the maximally constant value is $R_{DSonAC}$.

$$R_{DSonAC}(T, R_1) := R_{DSonA}(T) \cdot \left(\frac{R_1}{R_1 + R_{Th}(T)}\right)$$

$$\varepsilon(R_1) := \begin{vmatrix} i \leftarrow 0 \\ \text{for Temp} \in T_{Ambmin} - 5 \ldots T_{Ambmax} + 5 \\ \quad \begin{vmatrix} R_{DSonAC_i} \leftarrow R_{DSonAC}(Temp, R_1) \\ \quad i \leftarrow i + 1 \end{vmatrix} \\ Err_{Max} \leftarrow \max(R_{DSonAC}) \\ Err_{Min} \leftarrow \min(R_{DSonAC}) \\ \Delta \leftarrow Err_{Max} - Err_{Min} \\ \text{return} \begin{pmatrix} Err_{Max} \\ Err_{Min} \\ \Delta \end{pmatrix} \end{vmatrix}$$

With the initial guess of $R_1 := 500 \cdot \Omega$, the error terms are:

$$\varepsilon(R_1) = \begin{pmatrix} 0.9673 \\ 0.9295 \\ 0.0379 \end{pmatrix} m\Omega; \quad \varepsilon(R_1)_2 = 0.0379 \, m\Omega$$

Figure 5:
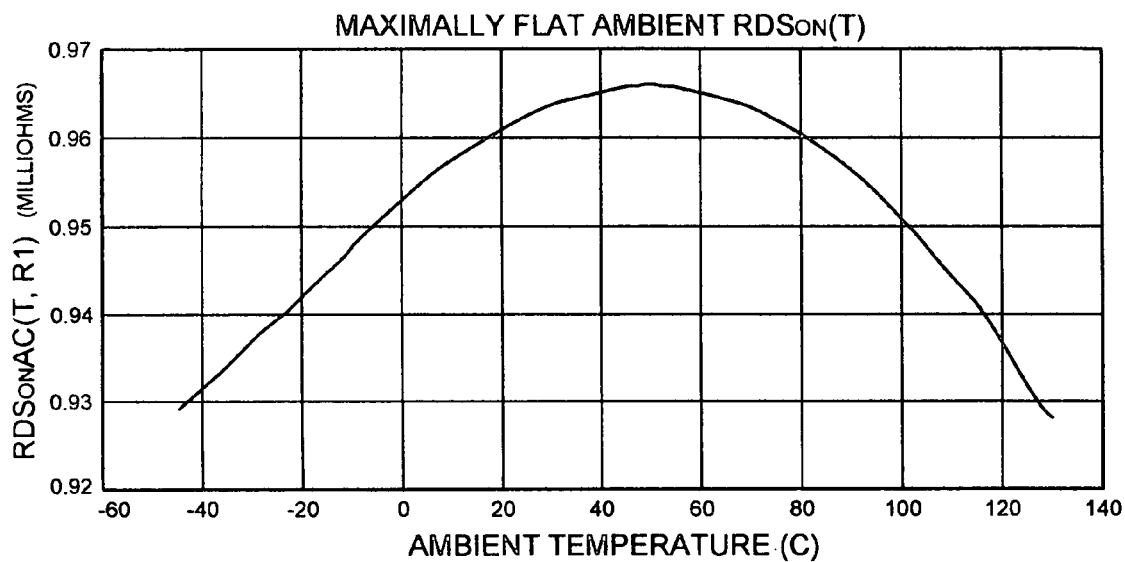
FIG. 5 is a graph depicting an exemplary maximally flat variable resistance curve for a FET.

The "Delta Error" is in vector element '2'. Optimizing the circuit yields the following (see FIG. 5):

Given $0 \, \Omega = \varepsilon(R_1)_2 R_1 > 1 \, \Omega$ $R_1 := \text{Minerr}(R_1) \quad R_1 = 501.2418 \, \Omega$ $R_1 := R_{Nearest\_1\%}(R_1)$ Thus, $R_1 = 499.0000 \, \Omega$ $$R_{DSonACavg} := \varepsilon(R_1)_1 + \frac{\varepsilon(R_1)_2}{2}$$

$R_{DSonACavg} = 0.9470 \text{ m}\Omega$

Normalizing $R_{DSonAC}$ to the range average value gives the following:

$$R_{DSonACN}(T, R_1) := \frac{R_{DSonA}(T) \cdot \left(\frac{R_1}{R_1 + R_{Th}(T)}\right)}{R_{DSonACavg}}$$

Figure 6:
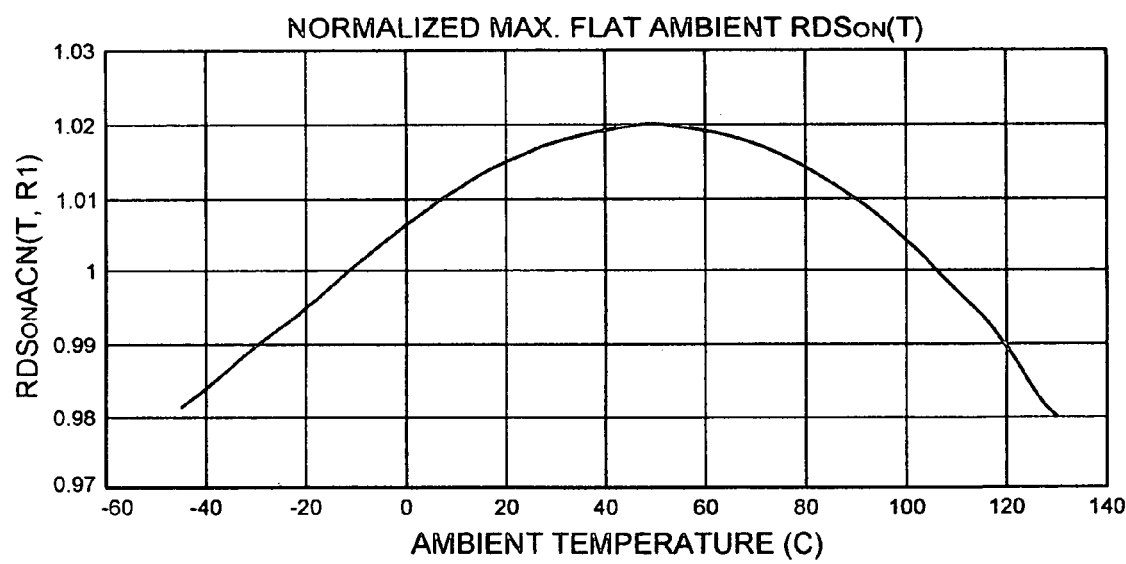
FIG. 6 is a graph depicting an exemplary normalized maximally flat variable resistance curve for a FET.

The normalized graph of $R_{DSonAC}$ (see FIG. 6) is much less temperature dependent than the original $R_{DSonA}$. Assuming the circuit provides an output voltage, $V_{AO2}$, at a specific peak drain current, $I_{Dpk}$ at some temperature, say 25 degrees Celsius, for example, let $V_{AO2req} := 0.8 \cdot$vol at $I_{Dpk25} := 40 \cdot$amp. It is then necessary to obtain the FET drain-to-source resistance $R_{DSon}$ corresponding to a temperature of 25 degrees Celsius. But this is just $R_{DSonA}(25) = 2.8914$ m $\Omega$. This corresponds to an amplifier output of:

$$V_{AO2pk25} := I_{Dpk25} \cdot R_{DSonA}(25) \cdot \left(\frac{R_1}{R_1 + R_{Th}(25)}\right),$$

or $V_{AO2pk25} = 38.5010$ mV

Thus, it is necessary to increase the output voltage $V_{AO2}$ by a gain factor of:

$$G := \frac{V_{AO2req}}{V_{AO2}}, \text{ or } G = 20.7787.$$

To distribute this gain equally over the two amplifier stages requires a stage gain of:

$G_{stage} := \sqrt{G}$, or $G_{stage} = 4.5584$

In the circuit, let:

$R_5 := 1000 \cdot \Omega$

The first amplifier gain is:

$$G_{stage} = 1 + \frac{R_4}{R_5}$$

Thus, $R_4 := R_5 \cdot (G_{stage} - 1)$, or $R_4 = 3558.3655 \Omega$

Choosing the nearest 1% resistor value yields:

$R_4 := R_{Nearest\_1\%}(R_4)$, or $R_4 3570.0000 \Omega$

Then, $$G_{stage1} := 1 + \frac{R_4}{R_5}, \text{ or } G_{stage1} = 4.5700$$

This requires that the gain of stage two be:

$$G_{stage2} := \frac{G}{G_{stage1}}, \text{ or } G_{stage2} = 4.5468$$

Choosing $R_7 := 1000 \cdot \Omega$ gives:

$R_6 := R_7 \cdot (G_{stage2} - 1)$, or $R_6 3546.7605 \Omega$

The nearest 1% resistor value is:

$R_6 := R_{Nearest\_1\%}(R_6)$, or $R_6 = 3570.0000 \Omega$

The resulting cumulative gain is:

$$G_{actual} := \left(1 + \frac{R_4}{R_5}\right) \cdot \left(1 + \frac{R_6}{R_7}\right), \text{ or } G_{actual} = 20.8849$$

This results in an actual:

$V_{AO2actual}$ of $V_{AO2actual} := G_{actual} \cdot V_{AO2pk25}$, or $V_{AO2actual} = 804.0890$ mV.

Accordingly, a method and system have been described herein that provides a temperature compensated feedback signal for a switching power supply. The method and system provide a more economical and efficient switch power supply that can advantageously be implemented within an automotive environment.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A method for providing a temperature compensated feedback signal, comprising the steps of:
   providing a switch having a temperature dependent switch impedance;
   sampling a signal across the switch;
   amplifying the sampled signal;
   attenuating the amplified sampled signal as a function of a temperature of the switch; and
   amplifying the attenuated amplified sampled signal to provide a temperature compensated feedback signal for controlling operation of the switch, wherein the feedback signal corresponds to a temperature compensated version of the sampled signal.

2. The method of claim 1, wherein a thermistor is located in thermal contact with the switch to provide a temperature dependent impedance that is utilized to attenuate the amplified sampled signal.

3. The method of claim 2, wherein a temperature of the thermistor is within +/−5 degrees Celsius of the temperature of the switch.

4. The method of claim 2, wherein the thermistor has a positive temperature coefficient.

5. The method of claim 1, wherein the switch is one of a field-effect transistor (FET) and an insulated-gate bipolar transistor (IGBT).

6. The method of claim 1, wherein the signal across the switch is only sampled when the switch is conducting.

7. The method of claim 1, wherein the temperature dependent switch impedance is a temperature dependent switch resistance.

8. An electrical circuit for providing a temperature compensated feedback signal, the circuit comprising:
a first electrical component exhibiting a first temperature variable impedance, wherein the first electrical component is positioned in thermal contact with a first switch having a second temperature variable impedance;
a first amplifier including an input electrically coupled to the first switch and an output electrically coupled to an input of the first electrical component, wherein the first amplifier amplifies a signal produced across the first switch when the first switch is conducting; and
a second amplifier including an input electrically coupled to an output of the first electrical component, the first electrical component attenuating the amplified signal provided by the first amplifier as a function of a temperature of the first electrical component, wherein the second amplifier amplifies the attenuated amplified signal to provide a temperature compensated feedback signal at an output of the second amplifier.

9. The electrical circuit of claim 8, wherein the temperature of the first electrical component is within +/−10 degrees Celsius of a temperature of the first switch.

10. The electrical circuit of claim 8, further comprising:
a second switch electrically coupled to the input of the first amplifier, the second switch coupling the input of the first amplifier to ground when the first switch is not conducting.

11. The electrical circuit of claim 8, wherein the first electrical component is a thermistor.

12. The electrical circuit of claim 11, wherein the temperature of the thermistor is within +/−10 degrees Celsius of a temperature of the first switch.

13. The electrical circuit of claim 11, wherein the thermistor has a positive temperature coefficient.

14. The electrical circuit of claim 8, wherein the first switch is one of a field-effect transistor (FET) and an insulated-gate bipolar transistor (IGBT).

15. The electrical circuit of claim 8, wherein the first and second temperature variable impedances are temperature variable resistances.

16. A switching power supply, comprising:
a first switch having a first terminal, a second terminal and a control terminal, wherein the first terminal of the first switch is coupled to one side of a load and the second terminal of the first switch is coupled to ground, and wherein the first switch exhibits a temperature variable impedance between the first and second terminals when the first switch is conducting;
a control unit including a first output electrically coupled to the control terminal of the first switch;
an electrical circuit, comprising:
a first electrical component exhibiting a temperature variable impedance, wherein the first electrical component is positioned in thermal contact with the first switch;
a first amplifier including an input electrically coupled to the first terminal of the first switch and an output electrically coupled to an input of the first electrical component, wherein the first amplifier amplifies a signal produced across the first switch when the first switch is conducting; and
a second amplifier including an input electrically coupled to an output of the first electrical component, the first electrical component attenuating the amplified signal provided by the first amplifier as a function of a temperature of the first electrical component, wherein the second amplifier amplifies the attenuated amplified signal to provide a temperature compensated feedback signal at an output of the second amplifier, and wherein the feedback signal is provided to an input of the control unit and is utilized by the control unit to determine electrical characteristics of a control signal to be applied to the control terminal of the first switch.

17. The switching power supply of claim 16, wherein the temperature of the first electrical component is within +/−5 degrees Celsius of a temperature of the first switch.

18. The switching power supply of claim 16, further comprising:
a second switch electrically coupled to the input of the first amplifier, the second switch coupling the input of the first amplifier to ground when the first switch is not conducting.

19. The switching power supply of claim 16, wherein the first electrical component is a thermistor.

20. The switching power supply of claim 19, wherein the temperature of the thermistor is within +/−5 degrees Celsius of the temperature of the switch.

21. The switching power supply of claim 19, wherein the thermistor has a positive temperature coefficient.

22. The switching power supply of claim 16, wherein the first switch is one of a field-effect transistor (FET) and an insulated-gate bipolar transistor (IGBT).

23. The switching power supply of claim 16, wherein the first and second temperature variable impedances are temperature variable resistances.

24. An electrical circuit for providing a temperature compensated feedback signal, the circuit comprising:
a first electrical component exhibiting a first temperature variable impedance, wherein the first electrical component is positioned in thermal contact with a first switch having a second temperature variable impedance; and
a first amplifier including an input electrically coupled to the first switch and an output electrically coupled to an input of the first electrical component, wherein the first amplifier amplifies a signal produced across the first switch when the first switch is conducting and the first electrical component attenuates the amplified signal provided by the first amplifier as a function of a temperature of the first electrical component, and wherein the attenuated amplified signal is provided at an output of the first electrical component to provide a temperature compensated feedback signal.

25. The electrical circuit of claim 24, further comprising:
a second amplifier including an input electrically coupled to the output of the first electrical component, wherein the second amplifier amplifies the attenuated amplified signal to provide the temperature compensated feedback signal at an output of the second amplifier.

26. The electrical circuit of claim 24, further comprising:
a second switch electrically coupled to the input of the first amplifier, the second switch coupling the input of the first amplifier to ground when the first switch is not conducting.

27. The electrical circuit of claim 24, wherein the first electrical component is a thermistor with a positive temperature coefficient that matches a temperature coefficient of the first switch, and wherein the temperature of the thermistor is within +/−5 degrees Celsius of a temperature of the first switch.

28. The electrical circuit of claim 24, wherein the first switch is one of a field-effect transistor (FET) and an insulated-gate bipolar transistor (IGBT), and wherein the first and second temperature variable impedances are temperature variable resistances.

* * * * *